June 11, 1963  K. ROSENBAUM  3,093,090
SWITCHES FOR MONOBEAM TYPE RAILWAYS
Filed July 29, 1958  3 Sheets-Sheet 2

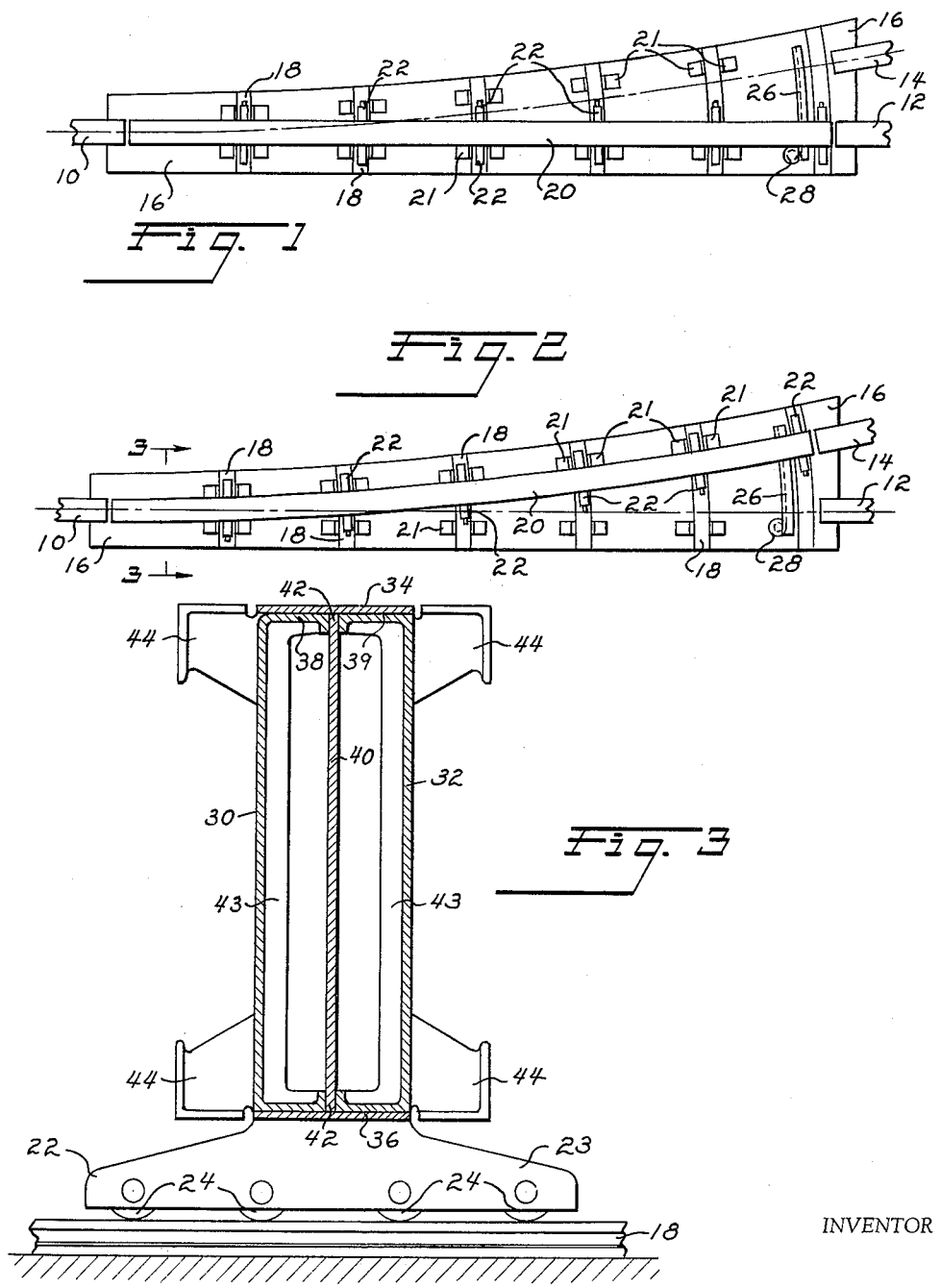

INVENTOR
KURT ROSENBAUM

BY Strauch, Nolan & Neale
ATTORNEYS

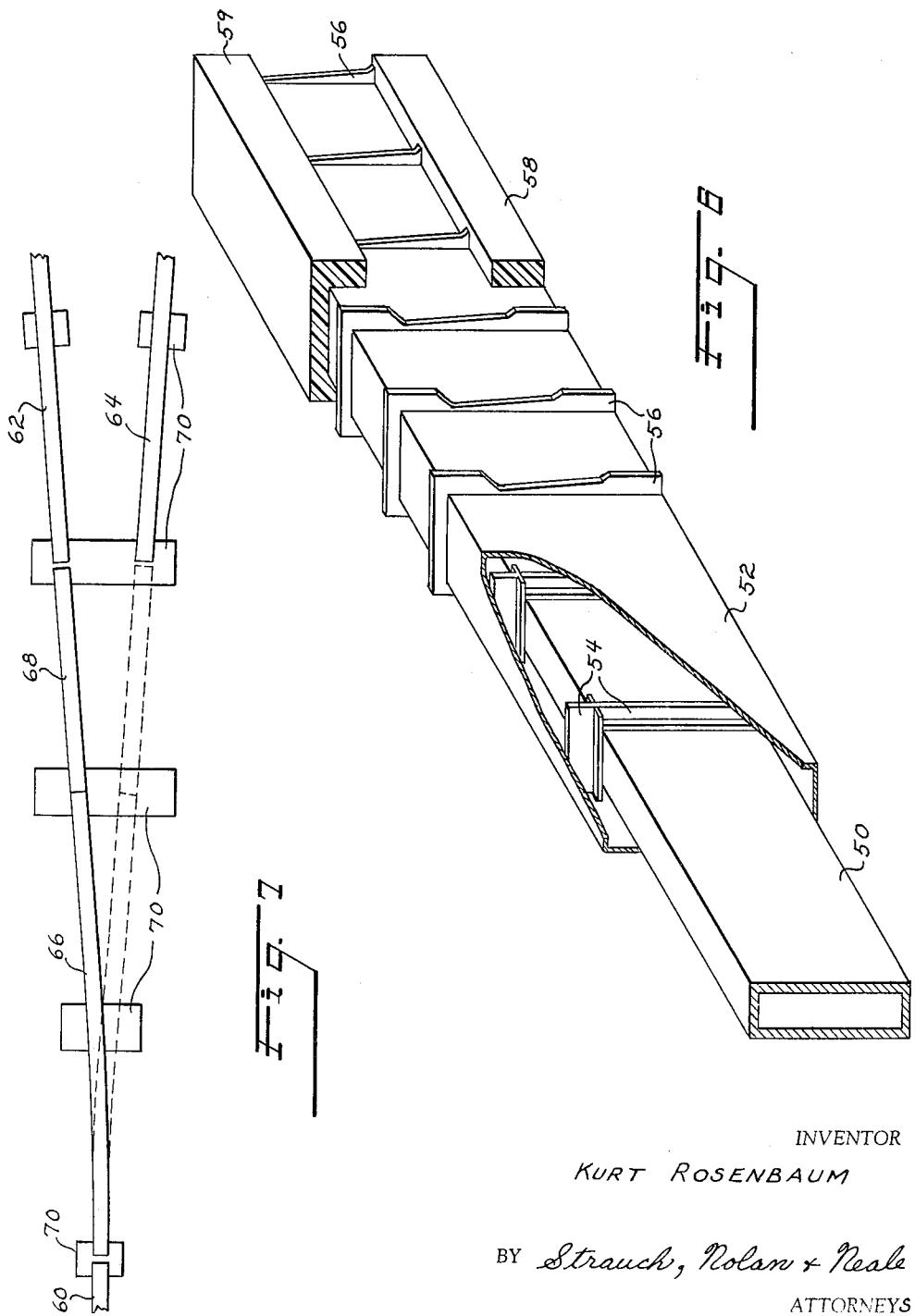

United States Patent Office 3,093,090
Patented June 11, 1963

3,093,090
SWITCHES FOR MONOBEAM TYPE RAILWAYS
Kurt Rosenbaum, Essen, Germany, assignor to Alweg-Forschung G.m.b.H., Cologne, Germany, a corporation of Germany
Filed July 29, 1958, Ser. No. 751,683
Claims priority, application Germany Aug. 3, 1957
5 Claims. (Cl. 104—130)

The present invention relates to switch constructions and more particularly to switch constructions for railway systems of the monobeam type. In such systems the track comprises a relatively heavy usually substantially rectangular beam member having top and side running surfaces, the former supporting the load carrying vehicle wheels and the latter engaging upper and lower lateral vehicle wheels which guide the vehicle and transfer tilting forces to the beam. Preferably the track beam is made of a reinforced concrete structure.

The main problem encountered when constructing switches for such monobeam systems is that the branches of the track which are to be connected by the switch track section must be separated by a substantial distance transversely to the track in order to permit the passage of the laterally depending portions of the vehicles over the switch. Therefore the transverse distance which the end of a switch tongue of monobeam type switches has to cover, becomes very great and must be at least half the width of a vehicle. Further, for the comfort of the vehicle passengers the radius of curvature of the switch must exceed certain limits and switches and especially multi-branch switches for monobeam type tracks are accordingly relatively long.

In the past in switches of this type one or more rigid straight beam sections have been provided which were pivotally connected to the main line and to each other and which in branching off position are angularly related to each other. In order to provide smoothly curved surfaces for the side wheels of the vehicle it has been suggested to arrange fiexible steel strips at the sides of such a switch, said steel strips forming the running surfaces for the side wheels of the vehicle. However, in some cases the construction of such a switch will be very complicated and expensive and designs of such a switch are of considerable length.

It is the primary purpose and object of the present invention to provide improved switch constructions for monobeam type railways which are simple in their structure and the construction costs of which are relatively low.

It is a further object to provide improved monobeam switch constructions which are easily and rapidly moved between two or more operating positions with relatively low power.

Still a further object of the present invention is to provide switch constructions the longitudinal extension of which is kept relatively small.

Additional objects and advantages will become apparent as the description proceeds in connection with the accompanying drawings illustrating typical embodiments of the invention and in which:

FIGURE 1 is a diagrammatic top plan view of a switch disposed in a position to connect aligned through track sections;

FIGURE 2 is a diagrammatic top plan view of the switch of FIGURE 1 disposed in a position to connect angularly related through track sections;

FIGURE 3 is a section taken along line 3—3 of FIGURE 2;

FIGURE 6 is a perspective view of a modification of a flexible track beam section, with parts broken away to show interior details; and FIGURE 7 is a diagrammatic top plan view of a switch installation incorporating flexible and rigid switch tongue sections.

Referring now more particularly to the drawings and especially to FIGURES 1 and 2, the track and switch construction comprises a main line beam 10, a second main line beam 12 aligned with the beam 10 and a branch line 14. Preferably those beam lines are of substantially rectangular cross section and are made of reinforced concrete. The ends of those beams and the entire switch construction are supported on a common supporting plate 16 preferably also made of concrete. Mounted to this supporting plate 16 are guide rails 18.

In an elevated monobeam construction, the supporting plate 16 may be mounted on pylons. The guide rails 18 may also be mounted directly each on separate pylons thus dispensing with the supporting plate 16 entirely.

Figure 4:
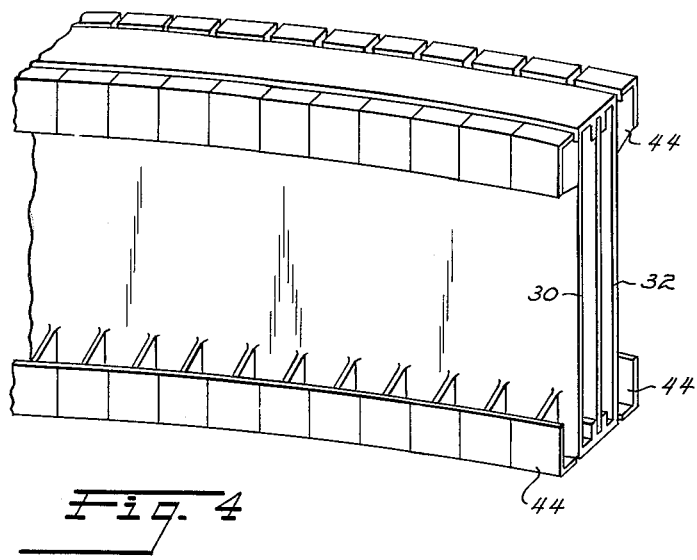
FIGURE 4 is a perspective view of a portion of the switch tongue of the embodiment of FIGURE 3.

The switch construction comprises further a flexible beam section 20 forming the switch tongue and which is described in greater detail hereinafter in connection with FIGURES 3 and 4. This flexible beam section is mounted upon bogies generally designated with numeral 22. At its free end adjacent to the main line 10 the flexible beam section 20 is fixedly secured to the supporting plate 16 by means, not shown, such as bolts or the like. Numeral 21 designates stops for the lateral movement of the switch tongue.

The bogies per se do not form part of this invention and may be of any suitable design. As shown in detail in FIGURE 3, they may comprise a steel cast support construction 23 provided with wheels or rolls 24 adapted to run on the guiding rails 18. The flexible beam section can be swung from the position shown in FIGURE 1 to that of FIGURE 2 by any suitable driving means which per se does not from part of this invention. For example a driving means similar to that disclosed in the copending application Serial No. 569,855, filed March 6, 1956, now Patent No. 2,903,972, may be utilized.

In FIGURES 1 and 2 a rack and pinion mechanism is indicated which may serve for operating the switch. A rack 26 is fixedly secured on top of the supporting plate 16 and a pinion 28 mounted on the shaft of an electric motor (not shown) which is fixedly secured to the end of the flexible beam section meshes with this rack and thereby moves the end of the flexible beam section.

The flexible beam section consists of a box shaped welded or riveted construction preferably made of a light metal alloy, for example aluminum alloy, and comprises side sheets 30 and 32 which are rigidly connected to each other by means of upper and lower longitudinal strips 34 and 36 respectively rigidly secured to the beveled horizontal flanges 38 and 39 of the respective side sheets 30 and 32. Centrally of this construction a steel sheet 40 is supported in the grooves 42 formed between the adjacent ends of the flanges 38 and 39 and can slide therein in order to compensate for differences in the coefficient of expansion between the light metal structure and the steel sheet.

Within the box structure stiffening sections 43 are arranged. In order to decrease the forces necessary for bending the elastic beam section, the lateral width of the light alloy box has been made smaller than that of the normal beams. For obtaining the actual width without decreasing the elasticity of the beam, angle-braces 44 are mounted in spaced relation to each other on the side sheets 30 and 32, e.g. by welding. The outer side surfaces of the angle-braces form the upper and lower running surfaces of the beam structure. The top running surface is formed by the top surface of the upper strip 34. Due to the small distances between the anglebraces the beam can be bent without deforming the anglebraces as shown in FIGURE 4. The entire beam structure is fixedly secured, e.g. by bolts or rivets, to the above-mentioned bogies 22, one of which is shown in FIGURE 3.

Figure 5:
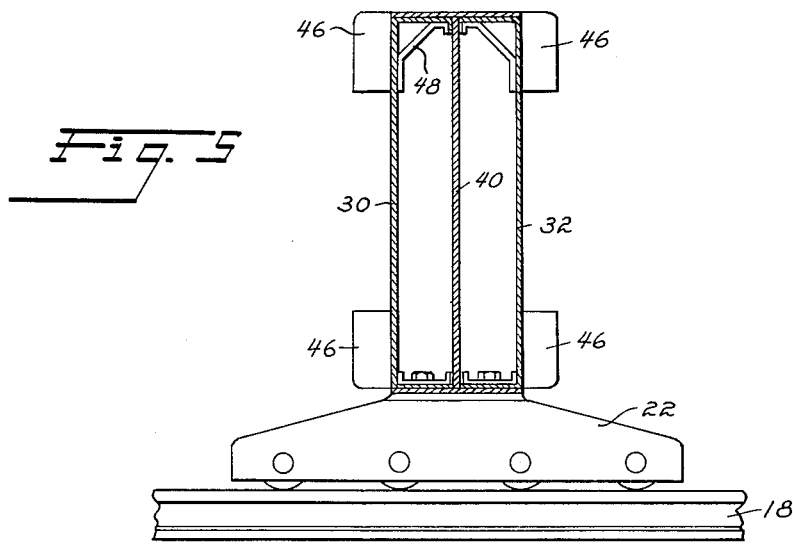
FIGURE 5 is a section of a modification of the embodiment of FIGURE 3.

As shown in FIGURE 5 instead of the spaced anglebraces 44 also blocks 46 made of synthetic plastic such as neoprene, or of wood or the like may be utilized to obtain the necessary width of the elastic beam structure without increasing unduly the forces necessary for bending the beam. The blocks 46 may either be cemented or screwed to the side sheets 30 and 32. In this embodiment angle pieces 48 serve for stiffening purposes. For the same purpose also transverse partition walls may be arranged within the box structure. Thus a beam construction is obtained consisting of different materials which are arranged in such a way that the Young's modulus of the materials at or near the center of the beam is the highest one and decreases in horizontal direction with the different materials applied, i.e., the modulus of the light metal alloy of the box construction is lower than that of the centrally arranged steel sheet 40 and that of the blocks 46 is again smaller than that of the light metal box construction.

In order to obtain a very strong construction of the flexible switch beam which is adapted to take up the horizontal and vertical forces and bending and torsional moments exerted during operation of the railway installation by the trains passing over the switch, the walls of the light metal box construction must be made fairly strong. However, the cost of light metal is very high. Therefore in a further embodiment of the invention shown in FIGURE 6 the flexible beam consists of two box-shaped girder constructions which are slidably telescoped into each other and which support each other. The inner box construction, generally designated by numeral 50, consists of steel and may comprise a welded construction, whereas the outer box construction 52 is made of a light metal alloy. T-shaped angle irons 54 are fixedly secured to the inner steel girder 50 and support the girder 50 against the inner walls of the outer light metal girder 52.

Retaining members 56 are secured to the outer sides of the girder 52, e.g. by welding, to support outer layers 58 and 59 the outer surfaces of which serve as running surfaces of the flexible beam section. Those layers consist of a material, the Young's modulus of which is smaller that that of the outer box-shaped girder 52. The material may be wood, rubber, a hard neoprene or the like.

Since the greater bending stresses are exerted in the most outside parts of the beam, i.e., in those points of the cross section, which have the greatest distance from the neutral fiber, and since according to the present invention this outermost material has a smaller Young's modulus than those close to the neutral fiber, it is possible to keep the forces for operating the switch very small in spite of the ability of the flexible beam section to take up great vertical and horizontal forces and vertically acting bending and torsional moments.

In order to decrease the length and therewith the costs of such a flexible switch construction, in the following embodiments one or more rigid beam sections are pivotally connected to the end of the flexible beam section and are moved therewith. Such a rigid beam section may be of a very simple construction preferably made of reinforced concrete as is the track beam section. Therefore it is much cheaper than the light metal flexible beam construction.

The transverse setting distance at the end of a switch tongue is doubled when a rigid beam section of half the length of the flexible beam section is arranged, the same distance is trebled when a rigid beam section having the same length as the flexible beam section is arranged.

FIGURE 7 shows a two-way monobeam switch by means of which the main line 60 can alternatively be connected with the branch lines 62 and 64. The switch per se comprises the flexible beam section 66 as described heretofore which has connected to its free end a rigid beam section 68. Preferably the end of the rigid beam section and the adjacent free end of the flexible beam section are mounted on the same bogie construction. The track beams and the switch beams are supported by supports 70. In this figure the bogies of the switch beam section, the corresponding guiding rails and the drive mechanisms have been omitted for clarity's sake and do not form part of the present invention.

By the utilization of the additional rigid beam sections which form extensions of the flexible beam section one main track section may be selectively connected with four or more branch lines without necessitating excessive bending nor decreasing the radius of curvature to the extent which requires a substantial reduction in the speed of the train as it passes over the switch.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. For use in a monobeam transportation system having a vehicle supporting beam with top and lateral running surfaces: a switch adapted to selectively connect angularly related track sections comprising, a plurality of switch beam sections pivotally connected to each other at adjacent ends, the body of one of said switch beam sections being elastically deformable and the remainder of said switch beam sections being rigid, and abutment means intermediate the ends of said elastically deformable switch beam section for bending said elastically deformable switch beam section smoothly along its longitudinal axis.

2. A switch construction for connecting a first monobeam track section selectively to second and third monobeam track sections comprising, a flexible switch beam section forming an extension of said first monobeam track section, said switch beam section having an elastically deformable body, abutment means intermediate the ends of said flexible switch beam section for bending said flexible switch beam section smoothly along its longitudinal axis, and at least one rigid switch beam section pivotally connected to the free end of said flexible beam section forming an extension thereof leading to said second or third monobeam track sections.

3. A flexible switch beam section for use in a monobeam railway system, said switch beam being of composite construction and having a central hollow metal core having a relatively high modulus of elasticity and at least two additional layers having successively decreasing moduli of elasticity.

4. A flexible switch beam for use in a monobeam railway, said switch beam being of rectangular section having its major axis extending substantially vertically and comprising a central hollow rectangular metal core structure having a relatively high modulus of elasticity, a nonferrous metallic shell of substantially rectangular section surrounding said core structure, and resilient means having a low modulus of elasticity mounted on the outer surfaces of said non-ferrous shell to provide running surfaces for a vehicle.

5. A flexible switch beam assembly for a monobeam track comprising a flexible switch beam member adapted to connect a first track section selectively with second and third angularly related track sections, said member having an elastically deformable body, means mounting one end of said switch beam member adjacent one end of said first track section, means for shifting the opposite end of said switch beam member from a position of alignment with said second track section to a position of alignment with said third track section, and abutment means engageable with said switch beam member intermediate its ends to dispose the longitudinal axis of said switch beam member in a smooth continuous curve when the free end of said switch beam member is aligned with said third track section.

References Cited in the file of this patent

UNITED STATES PATENTS

| | | |
|---|---|---|
| 424,693 | Turner et al. | Apr. 1, 1890 |
| 507,402 | Beecher | Oct. 24, 1893 |
| 733,501 | Moss | July 14, 1903 |
| 810,393 | Campbell | Jan. 23, 1906 |
| 1,014,503 | Messick | Jan. 9, 1912 |
| 1,329,304 | McClure et al. | Jan. 27, 1920 |
| 1,329,305 | McClure et al. | Jan. 27, 1920 |
| 2,434,523 | Sheets | Jan. 13, 1948 |
| 2,903,972 | Schutze | Sept. 15, 1959 |

FOREIGN PATENTS

| | | |
|---|---|---|
| 167,507 | Australia | Dec. 10, 1953 |
| 212,249 | Australia | Nov. 15, 1956 |
| 533,327 | Canada | Nov. 20, 1956 |